(No Model.)
E. E. GILLETT.
SULKY HARROW.
No. 274,311. Patented Mar. 20, 1883.
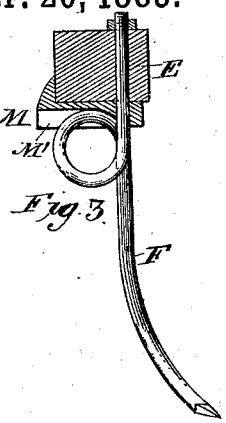
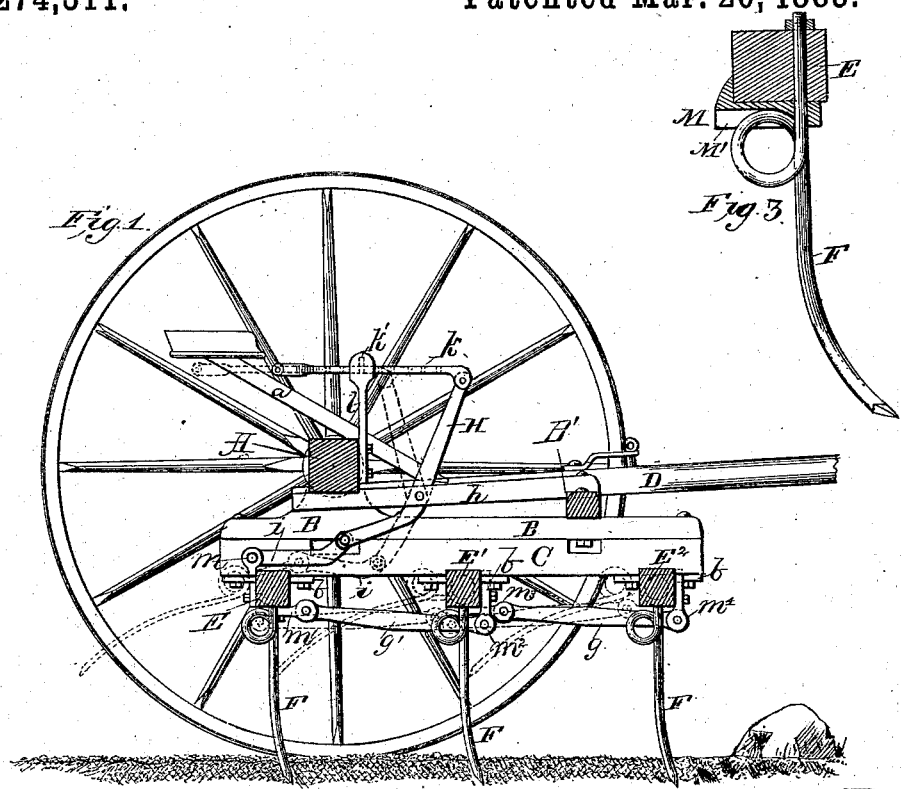
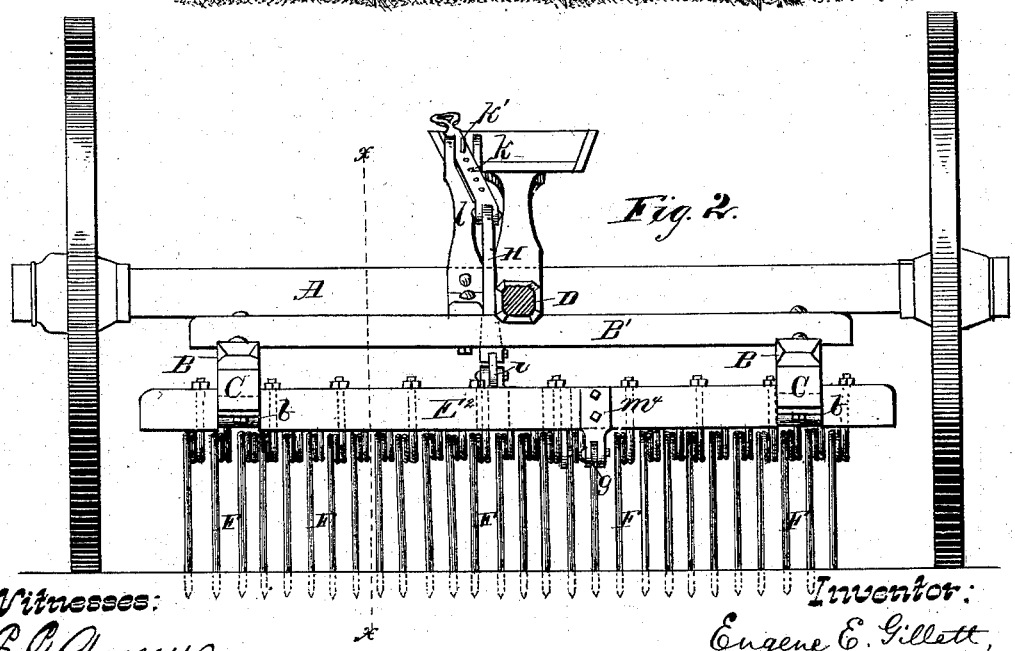
Witnesses:
E. G. Asmus
Carl Pickhardt.
Inventor:
Eugene E. Gillett,
By
Stout & Underwood
Attorneys.

UNITED STATES PATENT OFFICE.

EUGENE E. GILLETT, OF WESTERN UNION, WISCONSIN.

SULKY-HARROW.

SPECIFICATION forming part of Letters Patent No. 274,311, dated March 20, 1883.

Application filed April 11, 1882. (No model.)

*To all whom it may concern:*

Be it known that I, EUGENE E. GILLETT, of Western Union, in the county of Racine, and in the State of Wisconsin, have invented certain new and useful Improvements in Sulky-Harrows; and I do hereby declare that the following is a full, clear, and exact description thereof.

My invention relates to sulky-harrows; and it consists in certain details of construction, to be fully described hereinafter.

In the drawings, Figure 1 is a vertical section through my improved harrow, taken on line $x\ x$, Fig. 2. Fig. 2 is a front elevation, and Fig. 3 is a detail.

A is the axle, and B B are bolsters secured at right angles to it on its under side. While the bolsters are connected at their rear ends by the axle A, they are connected in front by a cross-bar, B', and this bar supports the body of tongue D.

To the under side of bolsters B, and parallel with them, I secure bars C, from which I suspend the bearings $b\ b\ b$ of the journals of beams E E' E², and from these beams I suspend the teeth F. The beam E carries one hinge-strap, $m$, that projects up from its rear side, and another, $m'$, that projects forward from its under side. Beam E' carries a like hinge-strap, $m^2$, that projects downward from its front side, and another, $m^3$, that projects forward from its under side, and the beam E² only carries one hinge-strap, $m^4$, which, projecting downward from its front, is jointed to a link, $g$, that connects it with strap $m^3$, while a link, $g'$, connects hinge-straps $m'$ and $m^2$. The strap $m$ is connected by a bent link, $i$, with the operating-lever H, and lever H is pivoted between a bar, $h$, and the tongue D, just in front of a standard, $l$, on top of which is a pin, $k'$, that engages with the perforations in a strap, $k$, that is hinged to the upper end of lever H. This strap $k$ extends back to within easy reach of the driver's seat, and by drawing upon it the driver is enabled to revolve the rear beam, E, and through it and the links $g\ g'$ and hinge-straps revolve all the tooth-beams at once, and thus carry the teeth F from a vertical position to any inclination backward between a vertical and a horizontal, and then, by slipping the pin $k'$ into one of the perforations in strap $k$, secure the beams in the desired position. The shanks of the teeth F are projected through the beams, and the coiled portion is designed to rest up in a groove, M', in casting M, whereby it is steadied or supported laterally.

I am aware that I am not the first to have provided sulky-harrows with revolving tooth-beams, and therefore I do not claim such, broadly; but What I do claim is—

The beams E E' E², connected by hinge-straps and links $m'$, $g'$, $m^2$, $m^3$, $g$, and $m^4$, as described, in combination with strap $m$, link $i$, lever H, strap $k$, and standard carrying a pin, $k'$, as set forth.

In testimony that I claim the foregoing I have hereunto set my hand, on this 21st day of March, 1882, in the presence of two witnesses.

EUGENE E. GILLETT.

Witnesses:
S. S. STOUT,
HAROLD G. UNDERWOOD.